W. T. RICHARDS.
Metal Punch.
No. 82,993. Patented Oct. 13, 1868.
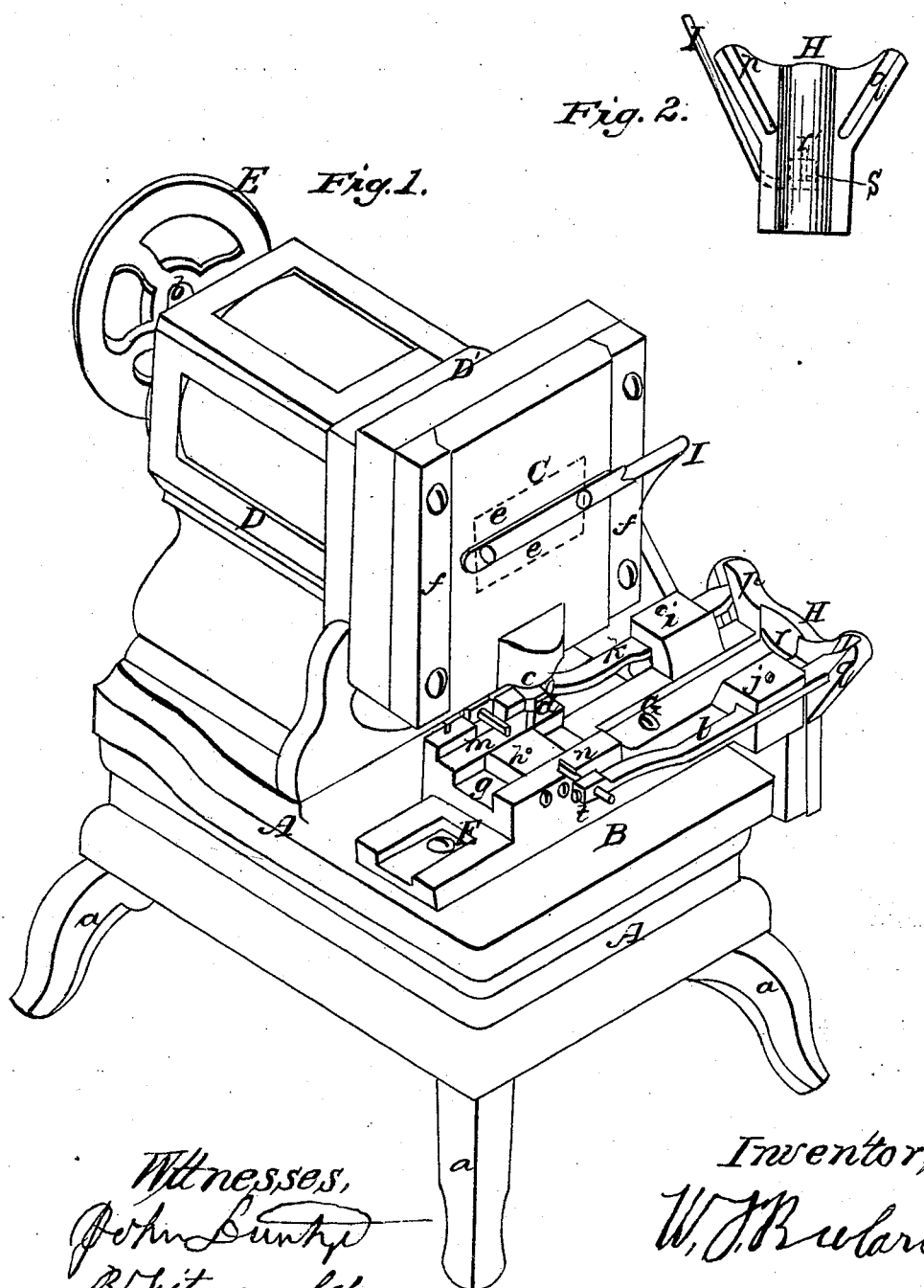

United States Patent Office.

WILLIAM T. RICHARDS, OF BRIDGEPORT, CONNECTICUT.

Letters Patent No. 82,993, dated October 13, 1868.

IMPROVEMENT IN PUNCHING MACHINES.

The Schedule referred to in these Letters Patent and making part of the same.

*To all whom it may concern:*

Be it known that I, WILLIAM T. RICHARDS, of the city of Bridgeport, in the county of Fairfield, and State of Connecticut, have invented a new and useful Improvement in Machinery for Centring Plates for Punching, &c.; and I do hereby declare that the following is a full, clear, and exact description of the construction, character, and operation of the same, reference being had to the accompanying drawings, which make part of this specification, in which—

Figure 1 is a perspective view of the machine, showing its working-parts in their several working-positions.

Figure 2 is a plan of the slide, with the inclined planes or grooves which operate the levers that carry the two gauge-points, as detached from the machine.

My improvement consists in working a vertical gate or slide by means of an eccentric, in such a manner that, by means of a crooked lever, I elevate and depress another slide in which there are two inclined slots or grooves moved upon the ends of two levers, each of which vibrates on a joint-pin, or fulcrum, so that their opposite ends will work or carry guides which insure the central position of the plate to be punched.

I make the main frame A A of cast-iron or any other suitable material, substantially in the form represented in fig. 1, with suitable legs $a\ a\ a$; a bed-plate, as B, to sustain the centring-apparatus, as F, G, &c.; and female die $h$, and a standard or upright, as D D', to sustain the working-parts of the punching-apparatus, as the gate, or slide C, the cam-shaft $b$, the cam or eccentric, (not seen,) with the punch-holder $c$ and punch $d$.

I make the standard part D D', of cast-iron, or any other suitable material, all in one piece, or otherwise, and make or leave a hole through it longitudinally (and parallel with the bed-plate B) to receive the shaft $b$ of the cam, or eccentric, which works in a slot or space indicated by dots at $e\ e$, to elevate and depress the gate or slide C.

I make the gate or slide C of cast-iron, or any other suitable material, substantially of the form or shape shown at C, with a horizontal recess in the inner part, as indicated by dots at $e\ e$, in which recess the cam or eccentric works to elevate and depress the slide.

And at the central part, at the lower extremity, I cast or fit on a suitable punch-holder, as represented at $c$, in which I fit any suitable punch, as $d$, which of course can be varied to suit the work to be done.

I have this slide C work or move in suitable guides, in the usual way, as shown at $f\ f$, fig. 1.

To work this slide C and punch $d$, I make a rod or shaft of iron, or any other suitable material, the rear end of which is shown at $b$; and on its front end I make or fit a cam or eccentric, (not seen,) which works in the horizontal space in the slide C, indicated by dots at $e\ e$, it being the usual way of elevating and depressing such gates or slides. And on the rear end of this shaft $b$, I fit a suitable wheel, as represented at E, by which I revolve the shaft when and as desired for use.

On the bed-plate B, I fit a supplemental frame or casting, as represented at F G, in the central part of which I plane or make a dovetail-recess, as shown at $g$, into which I insert the stationary or female die, as $h$; and near the rear end I have two slotted projections or ears, as shown at $i$ and $j$.

In the ears $i$ and $j$, I have the fulcra of the two vibrating levers $k$ and $l$, the front ends of which carry adjustable gauge-points or hands, as shown at $m$ and $n$, while their rear ends are confined loosely in movable inclined slots or grooves, as shown at $p$ and $q$, so as to cause the two levers $k$ and $l$ to vibrate horizontally to equal extents in equal and the same time.

The face of the movable piece H which contains the inclined grooves or slots $p$ and $q$, is shown fully in fig. 2, and I secure it to the rear end of the frame or casting F G by means of a male and female dovetail, as represented at $r$, fig. 1.

On the back of this movable piece H, I cast or fix a projection, under which the point of the crooked lever I passes, as indicated by dots at $s$, fig. 2, in the ordinary way of elevating slides. And as this crooked lever I is attached to the gate or slide C, fig. 1, the sliding piece H will be carried upward with it to expand the gauges $m$ and $n$.

And with the lower end or extremity of this sliding piece H, I connect a spring, (not seen,) or I use any other equivalent means, to draw the slide H downward when it is not held or forced upward by the crooked lever I while acted on by the power which elevates the slide C.

Having made and arranged the several parts, as before described, I apply the power to the wheel E, by hand or otherwise, and revolve it, when the cam or eccentric, working in the space indicated at $e\ e$, will elevate the gate or slide C, and with it the crooked lever I, and carry up the slide H, when the space between the inclined grooves $p$ and $q$, at the height of the rear ends of the levers $k$ and $l$, will be lessened, and, therefore, the ends carrying the gauges $m$ and $n$ will be spread apart sufficiently to receive between the gauges $m$ and $n$, and on the lower die $h$, the plate to be punched, when, by continuing to revolve the cam, the gate C will be depressed, and with it the lever I, and, by the action of the spring, the slide H, until the gauges m and n come in contact with the edges of the plate to be punched, and bring its centre exactly over the centre of the female die h, and hold it firmly in that position until the punch d passes through it, when the gate C will again be elevated, carrying up with it the lever I and slide H, and, consequently, opening the gauges m and n, when all will be ready for the next operation, and so on.

I make the gauges or hands adjustable, and secure them in their desired positions by set-screws, as shown at t and v, fig. 1, so that they can be adjusted with perfect accuracy.

What I claim as my invention, and desire to secure by Letters Patent, is—

The arrangement, herein described, of the gauge-levers k and l, slotted plate H, lever I, and the punch-stock or gate c, as and for the purpose set forth.

WM. T. RICHARDS.

Witnesses:
JOHN DUNTZE,
R. FITZGERALD.